May 5, 1953  S. K. LOWE  2,637,497
VEST-POCKET TYPE CALCULATOR
Filed March 24, 1950
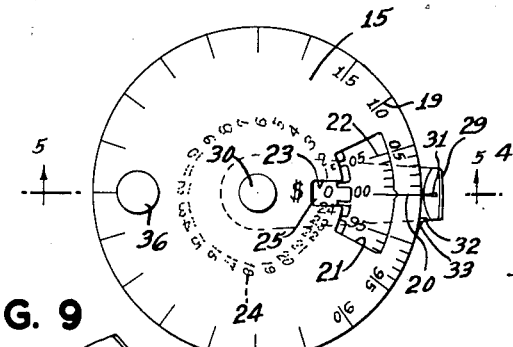
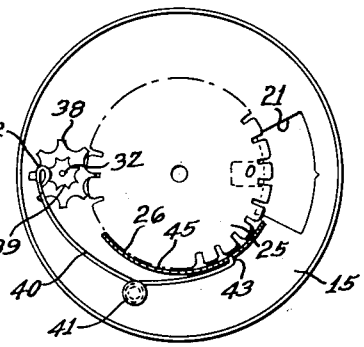
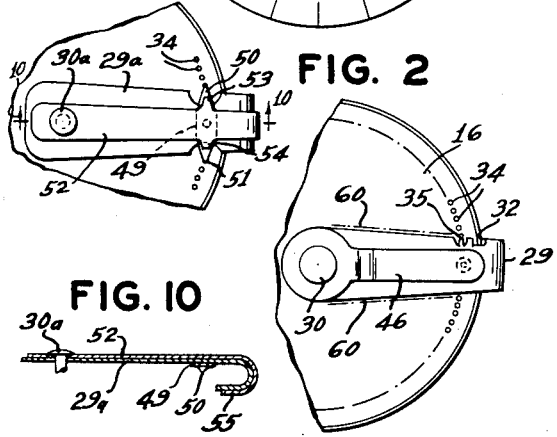
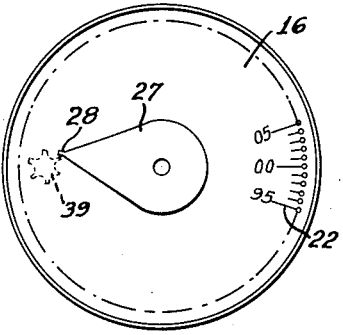
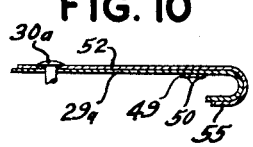
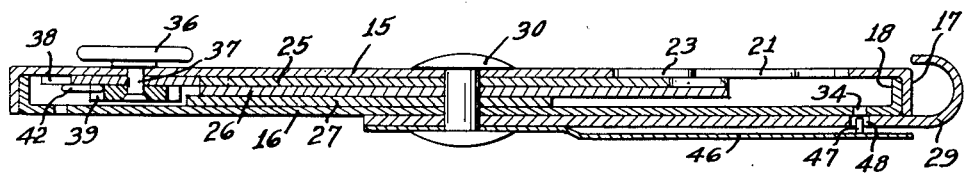
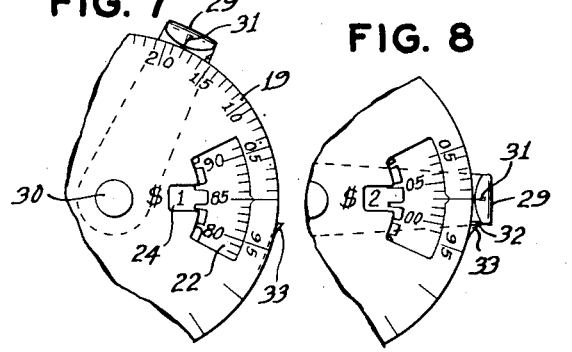
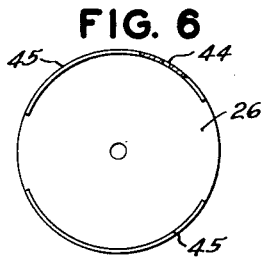
INVENTOR
Sahn K. Rowe Patented May 5, 1953

2,637,497

UNITED STATES PATENT OFFICE 2,637,497

VEST-POCKET TYPE CALCULATOR

Sahn K. Lowe, Honolulu, Territory of Hawaii

Application March 24, 1950, Serial No. 151,788

14 Claims. (Cl. 235—78)

My invention relates to improvements in compact calculating devices especially for performing addition and subtraction.

Various proposals have been made for providing pocket calculating machines but as far as known, none have been sufficiently practicable to be manufactured and sold except stylus-operated devices which are relatively complicated and expensive.

The primary object of my invention is to provide a light weight inexpensive unitary device which can be readily carried in a vest pocket, hand-bag or pocket-book.

Another object of my invention is to provide a vest-pocket calculator which can be readily made of easily worked inexpensive materials and by mass production methods.

According to my invention, my calculator comprises a flat disc-like device including a top plate having a peripherial scale and a window adjacent the zero position of the scale, a bottom plate concentric with the top plate and pivoted thereto by an axial pivot member, said bottom plate having a circular scale on its upper surface similar to the scale on the top plate and visible through said window, a member or value selector and actuator arm pivotally mounted on said pivot member below the bottom plate and extending radially therefrom, the outer portion of said arm having an indicator means adjacent the scale on the top plate, and cooperating means operatively arranged between said arm and the bottom plate for rotating the bottom plate relative to the top plate when the outer end of the arm is moved relative to the top plate.

In a preferred construction at least one intermediate plate or disc is mounted between the top and bottom plates having a scale visible through the window, the intermediate plate or disc being rotatable step-by-step by predetermined rotation of the bottom plate and also independently by hand in either direction.

Another feature of my device comprises a ratchet-like means arranged between the actuator arm and the bottom plate whereby this plate will be rotated when the arm is moved in one direction but not, during an adding operation, when the arm is moved in the other direction. When it is desired to subtract a number, means is provided on the arm which is actuated by the operator for engaging the bottom plate and rotating it in the other direction.

My device is especially useful to many persons who have occasion to add lists of purchases or other items. For example, as a person selects grocery items in a self-service store, he simply operates the calculator device to add the price of each item. If the purchaser selects an item and later wants it off his list, its price is readily subtracted on the calculator. At the end, the total is visible in the window and can be readily compared with the total arrived at by the store cashier.

The device of my invention includes additional features which are described hereinafter in connection with an illustrative embodiment shown in the accompanying drawings forming a part of this application.

In the drawings:

Fig. 1 is a top plan view of a device for performing addition and subtraction operations and embodying the features of my invention.

Fig. 2 is a view of the reverse side of the device shown in Fig. 1.

Fig. 3 is a view from the back showing the inside mechanism with the bottom plate removed and another part broken away.

Fig. 4 is a view showing the inside arrangement of the bottom plate.

Fig. 5 is a sectional view on an enlarged scale taken on the line 5—5 of Fig. 1.

Fig. 6 is a top view of the intermediate cover disc shown in Figs. 3 and 5.

Figs. 7 and 8 are broken views similar to that of Fig. 1 illustrating particular operations.

Fig. 9 is a bottom view of a modified form of actuator arm.

Fig. 10 is a sectional view taken on the line 10—10 of Fig. 9.

Referring to Figs. 1 to 5 of the drawings, the device comprises a top plate 15 and a bottom plate 16 respectively provided with peripheral oppositely extending flanges 17 and 18. The flange 17 extending over the flange 18 and being knurled to provide a grip for the operator. The top plate is provided with a peripheral counterclockwise scale 19 divided into 100 units beginning and ending at a zero point or line 20. Inwardly of the scale 19 the top plate 15 is provided with a window 21 symmetrical with the zero line 20 and sufficiently large to expose a substantial sector of the bottom plate 16 which is provided with a counterclockwise scale 22, visable through the window 21. The scale 22 is concentric with the scale 19 and divided into 100 units like the scale 19.

The window 21 includes a radially extending smaller portion 23 which exposes a counterclockwise scale 24 carried adjacent the periphery of a disc 25 mounted directly under the top plate 15 and provided with peripheral gear teeth, one for and opposite each number of the scale 24. The scale 24, as illustrated divides the circle of the disc 25 into "25" divisions, numbered 0 to 24, but it may include any desired number of divisions. A spacer disc 26 is mounted between the disc 25 and the bottom plate 16 above a plate 27 fixed to the inside of the plate 16 and having an actuating point or tooth 28 positioned at about 180° from the zero line of the scale 22, as shown in Fig. 4.

A movable actuator arm 29 is mounted beneath the bottom plate 16 and its inner end extends around the axis of the plates 15, 16, 25 and 26 and is assembled thereto by means of a pivot member 30 which may be a bolt or rivet securing the assembly together so that the assembled discs and the actuator arm 29 fit snugly but are relatively rotatable with respect to each other on the pivot member 30. The arm 29 is of rigid sheet metal and its outer end is bent around the periphery of the plate 15 and provided with an indicator line or point 31, which, in Fig. 1, is shown adjacent to and opposite the zero line or mark 20. In this position a projection 32 on the arm 29 engages a stop 33 on the periphery of the plate 15 which permits movement of the arm 29 in a clockwise direction only to the zero mark 20 on the scale 19.

The plate 16 is provided with a circular row of holes 34, or equivalent, respectively corresponding to the units of the scale 22, and extending around the periphery of that scale. These holes provide engagement means, particularly in thin material, for receiving a pointed projection 35 (Fig. 2) extending toward the plate 16 from one edge of the arm 29. In performing an addition the edge 17 of the plate 15 is held in the left hand, the arm 29 is moved counterclockwise by the right hand until the indicator 31 is opposite the amount to be added, as shown on the scale 19, and then moved back to the stop 33. During the counterclockwise movement of the arm, the projection 35 moves like a ratchet dog over the holes 34 and then on the reverse movement engages the selected hole and rotates the plate 16 relative to the plate 15.

The face of the device is provided with a hand knob 36 for setting or resetting the disc 25 so that zero or a given number is visible in the window portion 23 opposite the zero mark 20. The knob 36 is fixed to a shaft 37 extending through plate 15. Large and small concentric pinion gears 38 and 39 are also fixed to shaft 37 as shown in Figs. 3 and 5. The gear 38 is the same thickness as, and meshes with the gear teeth of disc 25 bearing against the top plate 15. The gear 39 is relatively thicker and its teeth are adapted to be successively engaged by the tooth or point 28. When the plate 16 is rotated so that its zero position passes through the zero mark 20, the tooth 28 engages a tooth of the gear 39 and rotates gear 38 which rotates disc 25 one unit. The tooth 28 is slightly less than 180° counterclockwise from the zero position of scale 22, Fig. 4.

The correct positioning of the numbers of scale 24 in window 23 is assured by a spring 40 carried on a rivet 41 holding it to the top plate 15, as shown in Fig. 3, the spring including a rounded end portion 42 normally resting between two adjacent teeth of gear 39. When the zero position of plate 16 is rotated in either direction through the zero position 20, the point 28 rotates the disc 25 one unit of its scale 24.

The opposite end of the spring 40 includes an inwardly projecting portion 43 which fits in a hole 44 (Fig. 6) in the flange 45 of the disc 26 and prevents this disc from rotating so that the mere rotation of the bottom plate 16 will not influence disc 25. The spring 40 extends around the rivet 41 and its ends are under tension. The flange 45 of disc 26 is cut away at the positions of the gear 38 and the window 21, but otherwise extends at least or slightly more than the thickness of the disc 25, toward the underside of the top plate 15, thereby insuring ease of rotation of the disc 25.

The operation of the device when making an addition may be described in connection with the showing in Figs. 7 and 8 by assuming that the amount "18" is to be added to the amount "185" shown by combined scales 22 and 24 in Fig. 7. The "18" is measured off on the scale 19 by moving the arm 29 counterclockwise until the indicator 31 is at "18," as shown in Fig. 7. The arm 29 is then pulled down to the stop 33 as in Fig. 8, in which scale 24 now shows "2" and scale 22 shows "03," that is, a total amount of "203."

The means for effecting a subtraction comprises a flat spring arm 46 fixed to the inner end of the arm 29, held under the rivet 30 and extending along under the arm 29, as seen in Figs. 2 and 5. The outer portion of the spring arm 46 is normally spaced from the arm 29 and carries an upwardly projecting pin 47 normally extending into a hole 48 in the arm 29 and adapted to engage in the holes 34 of the bottom plate 16 when the outer end of spring arm 46 is pressed up against the arm 29.

In effecting a subtraction let it be assumed that we wish to subtract the amount "18" from the amount "203," shown by the setting in Fig. 8. With the arm 29 in this view set at zero the outer end of the spring arm 46 is pressed up, engaging the pin 47 (Fig. 5) into the hole 34 opposite to it in bottom plate 16, then the arms and plate 16 are moved counterclockwise until the indicator 31 is at "18" on scale 19. The result is shown in Fig. 7. When the arm 46 is released, the pin 47 is moved out of the hole 34 and the arm 29 is free to carry out another operation.

The modified form of actuating arm structure shown in Figs. 9 and 10 comprises an arm 29a, mounted the same as the arm 29, to which is attached a double pointed spring plate 49, the points 50 and 51 of which are adapted to be selectively engaged in the holes 34, one point for adding and the other point for subtracting. These points normally bias away from engagement and are selectively actuated for engagement by a thin lever 52, secured at one end by the rivet 30a and extending along the underside and around the outer end of the arm 29a. The lever 52 has side projections 53 and 54 extending respectively toward the points 50 and 51. When the lever 52 is moved laterally with respect to the arm 29a in the direction of point 51, the projection 53 bears against point 50 so that it will engage the holes 34 while the point 51 is released. The arrangement works the same but changes the points when the lever 52 is moved to the other side of the arm 29a.

The end portion 55 of the lever 52 extends around the outer end of the arm 29a and forms a friction grip to hold the lever firmly against the arm and keep it in the position to which it is moved. The upper portion of the arm 29a may carry the letters "a" for "add" and "s" for "subtract" on its upper surface, one of which is covered by the end 55 when the other operation is to be carried out, so that the operator can see at a glance where to set the lever 52 or its end 55 on the arm 29a.

Other means may be provided on the actuator arm for selectively operating the bottom plate in either direction to carry out the desired operation, addition or subtraction.

The bottom plate 16 of the device is advantageously provided with means to facilitate its setting to zero position, as shown in Fig. 1. This comprises markings 60 on the back of the plate 16, as shown in Fig. 2, designating the position for the arm 29 when it will make the zero setting when rotated clockwise to the stop 33. The space between the markings 60 for the edges of the arm 29 is labeled "Zero Set."

The disc 25 is readily set to zero by rotation of the hand knob 36, and this knob may be used to add or subtract numbers in the particular category of the scale 25. For example, if "118" were to be added, as in Figs. 7 and 8, instead of only "18," the arm 29 is operated as described above and the knob 36 is rotated counterclockwise one notch to add the first "1" of the amount "118," so that the total in Fig. 8 will be "303." The same result may be obtained by rotating the plate 16 clockwise one complete revolution, then the "18" as first described.

The scales 22 and 24 may be designated as desired, but the dollar sign ($) on the face of the device opposite the window 23 indicates an important use, in which cents up to 99 are on the scale 22 while dollars are on scale 24. The operator will understand that he may select his own meaning for the numbers on the scales. In the embodiment shown, the scale 22 carries units and tens while scale 24 carries hundreds and thousands. In operating the device the scale 19 serves as a base scale upon which amounts to be added or subtracted by movement of the scale 22, are measured off or noted for the positioning of the actuating arm.

What I claim is:

1. A calculator comprising a flat disc-like device including a top plate having a peripheral scale and a window adjacent the zero position of the scale, a bottom plate concentric with the top plate and pivoted thereto by an axial pivot member extending through said plates and holding them together, said bottom plate having a circular scale on its upper surface similar to the scale on the top plate and visible through said window, a flat disc mounted between said plates concentric therewith and rotatable on said pivot member, said disc being inside the scale on the bottom plate and having a scale thereon visible through said window, mechanism for rotating said disc through one division of its scale for each complete revolution of the bottom plate, a value selector and actuator arm pivotally mounted on said pivot member below the bottom plate and extending radially from said pivot member, the outer portion of said arm having an indicator means adjacent the scale on the top plate, and cooperating means operatively arranged between said arm and the bottom plate for rotating the bottom plate relative to the top plate when the outer end of the arm is moved relative to the zero position of the scale on the top plate.

2. A calculator as claimed in claim 1 in which said flat disc is provided with peripheral gear teeth, a gear mounted on the under-side of the top plate meshing with the gear teeth of said disc, means carried by the bottom plate for rotating said gear, and a hand knob on the top side of the top plate for rotating said gear.

3. A calculator as claimed in claim 2 including a small gear fixed to said gear, a tooth fixed to the bottom plate adapted to engage the teeth of the small gear, and spring means engaging the teeth of said small gear to position it.

4. A calculator as claimed in claim 3 including a spacer disc between the bottom plate and said flat disc, and means for holding said spacer disc against rotation with respect to the top plate.

5. A calculator as claimed in claim 4 in which said spacer disc includes peripheral flange means extending around at least portions of said flat disc and engaging the under side of the top plate.

6. A calculator comprising a flat disc-like device including a top plate having a circular scale of values on its peripheral upper surface, a pivot member extending through said plate axially of said circular scale, a disc-like plate axially mounted on said pivot member under said top plate and having a circular scale of values on its upper surface radially inside and corresponding to the scale on the top plate, a value selector and actuator arm having one end pivotally mounted on said pivot member and extending radially therefrom, the outer portion of said arm having an indicator means adjacent the circular scale on said top plate for selecting values on the scale thereon, cooperating means operatively arranged between said arm and said disc-like plate for effecting its rotation relative to the top plate when the outer end of the arm is moved relative to the zero position of the scale on the top plate, a flat disc of smaller diameter than that of said disc-like plate axially mounted for rotation on said pivot member, said flat disc having a circular scale of values on its upper surface inside the scale on said disc-like plate, said top plate having a window therein through which the scales on said disc-like plate and said flat disc are visible, said flat disc having peripheral gear teeth, and means cooperating with said disc-like plate and the teeth of said flat disc for rotating said flat disc.

7. A calculator as claimed in claim 6 in which said cooperating means includes a circular series of openings in the surface of said disc-like plate, and means movable toward said disc-like plate for selectively engaging said openings.

8. A calculator comprising a flat disc-shaped device including a top plate having a peripheral scale and a window adjacent said scale, a bottom plate concentric with the top plate and pivoted thereto by an axial pivot member extending through said plates and holding them together, said bottom plate having a circular scale on its upper surface corresponding to the scale on the top plate and visible through said window, an extending peripheral flange to properly space said plates and to stabilize frictionally their relative positions, a number or value selector and actuator arm pivotally mounted on said pivot member below the bottom plate and extending radially from the pivot member along the under surface of the bottom plate, the outer portion of said arm having an indicator means adjacent the scale on the top plate, and cooperating means operatively arranged between said arm and the bottom plate for rotating the bottom plate relative to the top plate when the outer end of said arm is selectively moved relative to the zero position of the scale on the top plate.

9. A calculator comprising a flat disc-shaped device including a top plate having a peripheral scale and a window adjacent said scale, a peripheral flange on the top plate extending toward an oppositely extending flange, a bottom plate concentric with the top plate and pivoted thereto by an axial pivot member extending through said plates and holding them together, said bottom plate having a circular scale corresponding to the scale on the top plate and visible through said window, said bottom plate having a peripheral flange of such dimensions as to engage the peripheral flange of the top plate to position and space properly the top plate and the bottom plate and to stabilize frictionally the relative positions of said plates, a number or value selector and actuator arm pivotally mounted on said pivot member below the bottom plate and extending radially from said pivot member along the under surface of the bottom plate, the outer portion of said arm having an indicator means adjacent the scale on the top plate, and cooperating means operatively arranged between said arm and the bottom plate for rotating the bottom plate when the outer end of said arm is selectively moved relative to the zero position of the scale on the top plate.

10. A calculator comprising a flat disc-shaped device including a top plate having a peripheral scale and a window adjacent the scale, a bottom plate concentric with the top plate and pivoted thereto by an axial pivot member extending through said plates and holding them together, said bottom plate having a circular scale on its upper surface corresponding to the scale on the top plate and visible through said window, a number or value selector and actuating arm pivotally mounted on said pivot member below the bottom plate and extending radially from the pivot member along the under surface of the bottom plate, the outer portion of said arm having an indicator means adjacent the scale on the top plate, cooperating means operatively arranged between said arm and the bottom plate for rotating the bottom plate relative to the top plate when the outer end of the arm is selectively moved relative to the zero position of the scale on the top plate, means on said arm normally biased for moving the bottom plate in one direction, and a hand operated means operatively associated with said arm for selectively effecting engagement with the bottom plate for rotating it in a direction opposite to said one direction.

11. A calculator comprising a flat disc-shaped device including a top plate having a peripheral scale and a window adjacent the scale, a bottom plate concentric with the top plate and pivoted thereto by an axial pivot member extending through said plates and holding them together, said bottom plate having a circular scale on its upper surface corresponding to the scale on the top plate and visible through said window, a number or value selector and actuator arm pivotally mounted on said pivot member below the bottom plate and extending radially from the pivot member along the under surface of the bottom plate, the outer portion of said arm having an indicator means adjacent the scale on the top plate, cooperating means operatively arranged between said arm and the bottom plate for rotating the bottom plate relative to the top plate when the outer end of the arm is selectively moved relative to the zero position of the scale on the top plate, cooperating means comprising a hand operated means including a second arm, and means on second arm for effecting selective engagement with the bottom plate to effect its rotation.

12. A calculator comprising a flat disc-shaped device including a top plate having a peripheral scale and a window adjacent the scale, a bottom plate concentric with the top plate and pivoted thereto by an axial pivot member extending through said plates and holding them together, said bottom plate having a circular scale on its upper surface corresponding to the scale on the top plate and visible through said window, a number or value selector and actuator arm pivotally mounted on said pivot member below the bottom plate and extending radially from the pivot member along the under surface of the bottom plate, the outer portion of said arm having an indicator means adjacent the scale on the top plate, cooperating means operatively arranged between said arm and the bottom plate for rotating the bottom plate relative to the top plate when the outer end of the arm is selectively moved relative to the zero position of the scale on the top plate, said cooperating means includes a contact means on said actuator arm adapted to be moved into position for contacting the bottom plate to rotate it in either direction, and a selector means on said actuator arm for controlling the positioning of said contact means, whereby said bottom plate may be rotated in either direction as selected by said selector means.

13. A calculator comprising a flat disc-like device including a top plate having a peripheral scale and a window adjacent the scale, a bottom plate concentric with the top plate and pivoted thereto by an axial pivot member extending through said plates and holding them together, said bottom plate having a circular scale on its upper surface similar to the scale on the top plate and visible through said window, a flat disc mounted between said plates concentric therewith and rotatable on said pivot member, said disc being inside the scale on the bottom plate and having a scale thereon visible through said window, independent external means to rotate said flat disc, a number or value selector and actuator arm pivotally mounted on said pivot member below the bottom plate and extending radially from said pivot member along the under surface of the bottom plate, the outer portion of said arm having an indicator means adjacent the scale on the top plate, and cooperating means operatively arranged between said arm and the bottom plate for rotating the bottom plate relative to the top plate when the outer end of the arm is selectively moved relative to the zero position of the scale on the top plate.

14. A calculator comprising a flat disc-like device including a top plate having a peripheral scale and a window adjacent the scale, a bottom plate concentric with the top plate and pivoted thereto by an axial pivot member extending through said plates and holding them together, said bottom plate having a circular scale on its upper surface similar to the scale on the top plate and visible through said window, a flat disc mounted between said plates concentric therewith and rotatable on said pivot member, said disc being inside the scale on the bottom plate and having a scale thereon visible through said window, said window having such shape and dimensions as to expose simultaneously only one division of the scale on said flat disc and a plurality of divisions of the scale on the bottom plate, mechanism for rotating said disc through one division of its scale for each complete revolution of the bottom plate, external means to rotate said disc independently of the rotation of the bottom plate, a value or number selector and actuating arm pivotally mounted on said pivot member below the bottom plate and extending radially from said pivot member along the under surface of the bottom plate, the outer portion of said arm having an indicator means adjacent the scale on the top plate, and cooperating means operatively arranged between said am and the bottom plate for rotating the bottom plate relative to the top plate when the outer end of the arm is selectively moved relative to the zero position of the scale on the top plate.

SAHN K. LOWE.

References Cited in the file of this patent

UNITED STATES PATENTS

| Number | Name | Date |
|---|---|---|
| 11,726 | Hatfield | Sept. 26, 1854 |
| 109,619 | House | Nov. 29, 1870 |
| 787,163 | Fevola | Apr. 11, 1905 |
| 1,207,439 | Picolet | Dec. 5, 1916 |
| 1,406,712 | Wolpert | Feb. 14, 1922 |

FOREIGN PATENTS

| Number | Country | Date |
|---|---|---|
| 650,902 | France | Oct. 1, 1928 |